United States Patent
Belpaire et al.

(10) Patent No.: US 8,636,870 B2
(45) Date of Patent: Jan. 28, 2014

(54) STRUCTURAL REINFORCEMENT MATERIAL, INSERT, AND REINFORCED CAVITY COMPRISING SAME

(75) Inventors: Vincent Belpaire, Brussels (BE); Dominique Mellano, Petit-Roelux Lez Braine (BE); Norman Blank, Rueschlikon (CH); Juergen Finter, Zurich (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/438,444

(22) Filed: Apr. 3, 2012

(65) Prior Publication Data
US 2012/0207986 A1 Aug. 16, 2012

Related U.S. Application Data

(63) Continuation of application No. 12/312,786, filed as application No. PCT/EP2007/063974 on Dec. 14, 2007, now abandoned.

(30) Foreign Application Priority Data

Dec. 15, 2006 (EP) .................................... 06126249

(51) Int. Cl.
B29C 65/00 (2006.01)
(52) U.S. Cl.
USPC ........................................................ 156/293
(58) Field of Classification Search
USPC ........................................................ 156/293
See application file for complete search history.

(56) References Cited

U.S. PATENT DOCUMENTS

| | | | |
|---|---|---|---|
| 5,096,517 A * | 3/1992 | Comert et al. | 156/79 |
| 5,266,133 A | 11/1993 | Hanley et al. | |
| 5,373,027 A | 12/1994 | Hanley et al. | |
| 5,766,719 A | 6/1998 | Rimkus | |
| 6,030,701 A | 2/2000 | Johnson et al. | |
| 6,058,673 A | 5/2000 | Wycech | |
| 6,305,136 B1 * | 10/2001 | Hopton et al. | 52/309.7 |
| 6,341,467 B1 * | 1/2002 | Wycech | 52/834 |
| 6,387,470 B1 | 5/2002 | Chang et al. | |
| 2003/0183317 A1 * | 10/2003 | Czaplicki et al. | 156/79 |
| 2007/0138683 A1 | 6/2007 | Kanie et al. | |

FOREIGN PATENT DOCUMENTS

| | | |
|---|---|---|
| EP | 0 620 259 A2 | 10/1994 |
| EP | 1 356 911 A2 | 10/2003 |
| EP | 1356911 A2 * | 10/2003 |
| WO | WO 2006/075009 A1 | 7/2006 |

OTHER PUBLICATIONS

Sep. 11, 2012 Japanese Office Action issued in Japanese Patent Application No. 2009-540784 (with translation).

* cited by examiner

*Primary Examiner* — Jeff Aftergut
*Assistant Examiner* — Carson Gross
(74) *Attorney, Agent, or Firm* — Oliff & Berridge, PLC

(57) ABSTRACT

A structural reinforcement material is provided that includes a base material selected from thermosets, low viscosity thermoplastics with short transition phases and low viscosities, low melting point metallic alloys, and combinations thereof. At STP, the structural reinforcement material is a solid or a formable dough or a mixture thereof. When heated to an activation temperature, the structural reinforcement material becomes flowable into a cavity. Following cooling, the structural reinforcement material is a solid or a thermoset with a strength sufficient to reinforce the cavity. A structural reinforcement insert comprising the structural reinforcement material is also provided, as is a reinforced cavity of an automobile and a method of reinforcing a cavity.

22 Claims, 3 Drawing Sheets

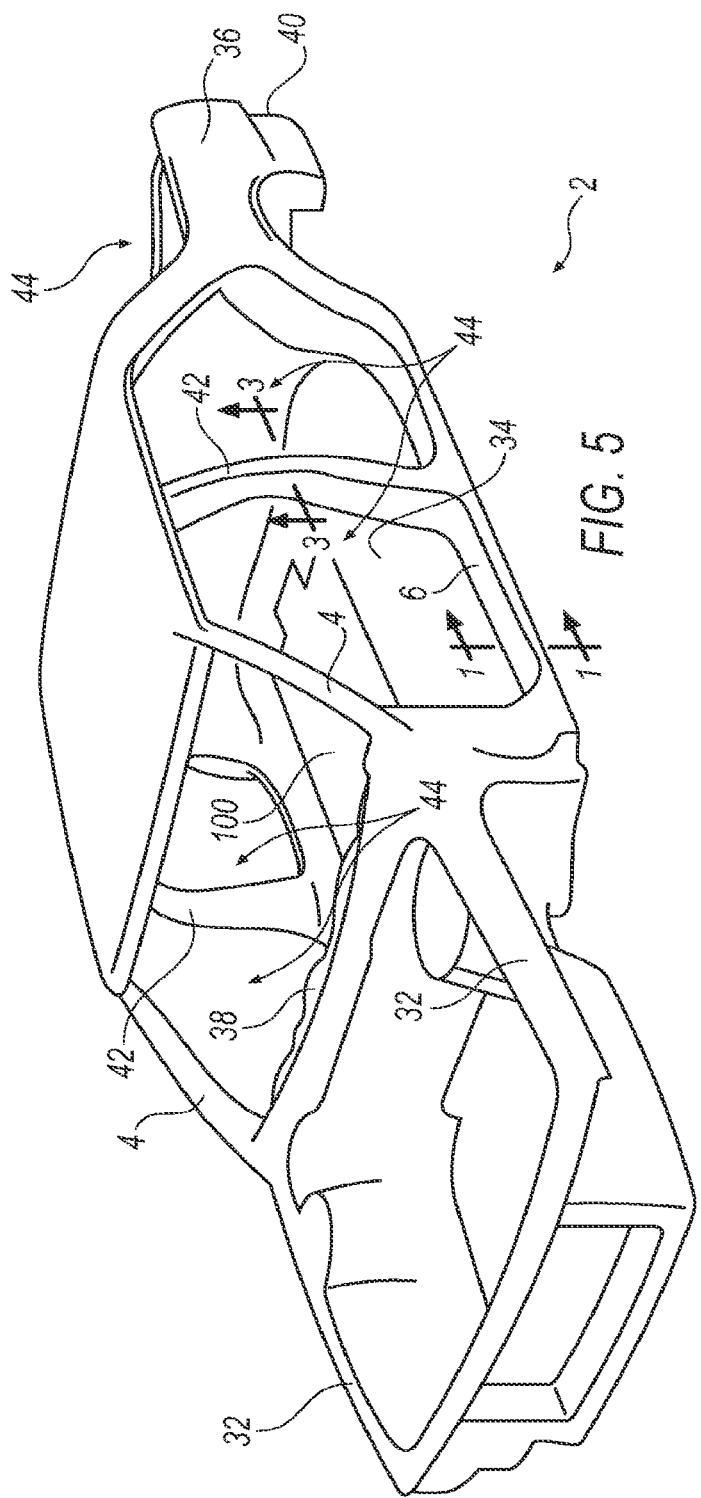

STRUCTURAL REINFORCEMENT MATERIAL, INSERT, AND REINFORCED CAVITY COMPRISING SAME

This is a Continuation of Application Ser. No. 12/312,786 filed Jun. 15, 2009, which in turn is a National Stage of Application No. PCT/EP2007/063974, filed Dec. 14, 2007, which claims priority to European Application No. 06126249.9, filed Dec. 15, 2006. The disclosure of the prior applications is hereby incorporated by reference herein in their entirety.

BACKGROUND

Many products have bodies or housings that include hollow cavities. As only some examples, automobiles, trucks, and other motor vehicles, as well as some consumer appliances, have hollow cavities formed between inner and outer panels, in pillars, or within their frame members that form their respective bodies or housings.

In particular, some structural members of automobile bodies have a variety of orifices, hollow posts, cavities, passages, and openings. Hollow cavities are often created in these products to reduce overall weight of the final product, as well as to reduce material costs. However, introducing hollow cavities into a structure involves tradeoffs. For example, introducing a hollow cavity may reduce the overall strength or energy-absorbing characteristics of a structural member. In addition, a hollow cavity may result in increased transmission of vibration or sound to other portions of the product.

It is known to use structural reinforcement materials to attempt to offset these and other tradeoffs. Some current reinforcers include an expansible material applied to a carrier, which typically is a molded component. The expansible material is expanded during the manufacture of the product, securing the reinforcer in place as the expanded material contacts the adjoining surface of the product. However, the expansible material in such reinforcers may not be securely joined to the carrier, leading to uneven or inadequate sealing. Moreover, expansion of the material may not reach every nook and cranny of an unusually or irregularly shaped carrier.

Additionally, some known expansible structural reinforcement materials can be sensitive to a heating process such as a "bake" process. The performance of such expansible materials is linked to the expansion rate, which depends upon the time and temperature of the heating.

Additionally, some known expansible structural reinforcement materials are thick, even before expansion. In such cases, the thickness of a pre-expansion material plus a gap between a reinforcement insert and a structural cavity can total about 8 to 10 mm to allow for e-coat flow and assembly tolerances. Structural reinforcement materials having reduced thicknesses can improve global system performance.

Thus, a need remains for an improved structural reinforcement material that alleviates at least some of these and other drawbacks.

SUMMARY

The appended claims describe an improved structural reinforcement material that alleviates at least some of the above-identified drawbacks of conventional reinforcement materials. A structural reinforcement material is described herein that comprises a base material. The base material may be selected from the group consisting of thermosets, low viscosity thermoplastics with short transition phases, low melting point metallic alloys, and combinations thereof. At about standard temperature and pressure (STP), the structural reinforcement material is either solid or formable dough or a mixture thereof. The structural reinforcement material transitions to a flowable phase, which includes without limitation a liquid or substantially liquid phase, during heating at an activation temperature. Following activation, cure and/or cooling, the structural reinforcement material is a substantially solid and has a strength sufficient to reinforce a cavity.

A method of reinforcing a cavity is described herein. The method includes a step of attaching a structural reinforcement material to a carrier to form an insert. The structural reinforcement material comprises a base material selected from the group consisting of thermosets, low viscosity thermoplastics with short transition phases, low melting point metallic alloys, and combinations thereof. At about STP, the structural reinforcement material is a solid, a formable dough, or a mixture thereof. The method includes a step of placing the insert into a cavity. Another step in the method involves heating the insert to an activation temperature such that the structural reinforcement material becomes liquid or substantially liquid and flows into the cavity. A curing process may occur, depending upon the nature of the base material, causing a thermoset to be formed. Following cooling of the insert, the solid structural reinforcement is adhered to at least a portion of the cavity, thereby reinforcing the cavity.

A structural reinforcement insert is described herein. The insert comprises a carrier having a first end and a second end opposite the first end, and at least one holding area between the first end and the second end. The holding area(s) contain structural reinforcement material. The structural reinforcement material comprises a base material selected from the group consisting of thermosets, thermoplastics with short transition phases and low viscosities, metallic alloys with low melting points, and combinations thereof. At about STP, the structural reinforcement material is solid, formable dough, or a mixture thereof. The structural reinforcement material is in a flowable phase following heating to an activation temperature. Following cooling after activation and/or cure, the structural reinforcement material has a strength sufficient to reinforce a cavity and is a solid or a thermoset solid. The insert also includes uncured expansible foam at or near the first end of the carrier. The insert also contains uncured expansible foam at or near the second end of the carrier. Upon heating to an activation temperature, the expanded foam prevents the flow of the liquid structural reinforcement material from the holding area to extend beyond the expanded foam into other regions of a cavity.

A reinforced cavity is also described herein. The cavity includes an insert within the cavity. The insert includes a holding area. The cavity includes cured or solidified structural reinforcement material comprising a base material selected from the group consisting of thermosets, low viscosity thermoplastics with short transition phases, metallic alloys with low melting points, and combinations thereof. The cured or solidified structural reinforcement material flowed from the holding area of the insert and is adhered to at least a portion of cavity and reinforces cavity.

BRIEF DESCRIPTION OF THE DRAWINGS

FIG. 5 is a perspective view of an automobile frame having multiple cavities therein.

DETAILED DESCRIPTION

Figure 1:
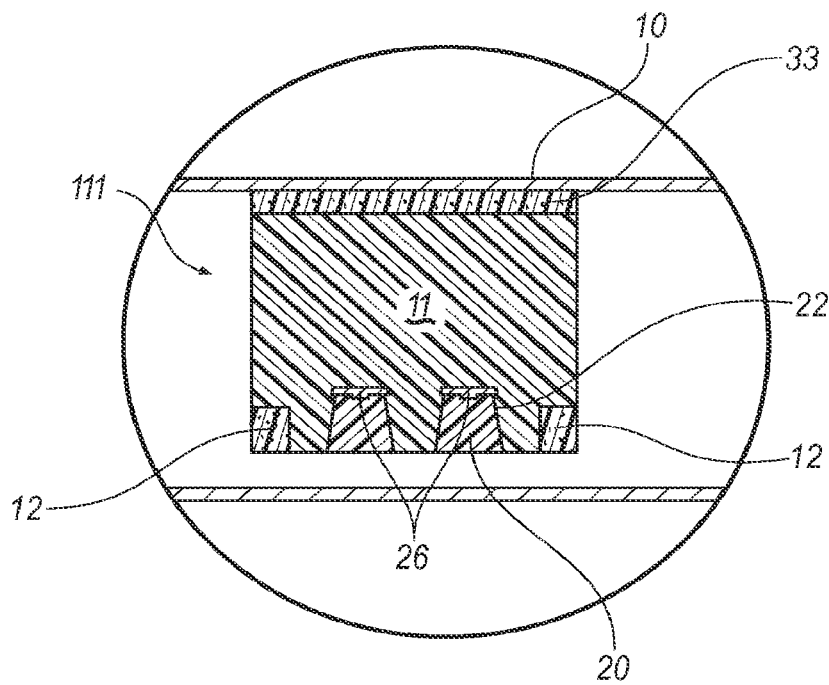
FIG. 1 is a side view of an insert in a horizontal cavity of a structural body before activation.
Figure 2:
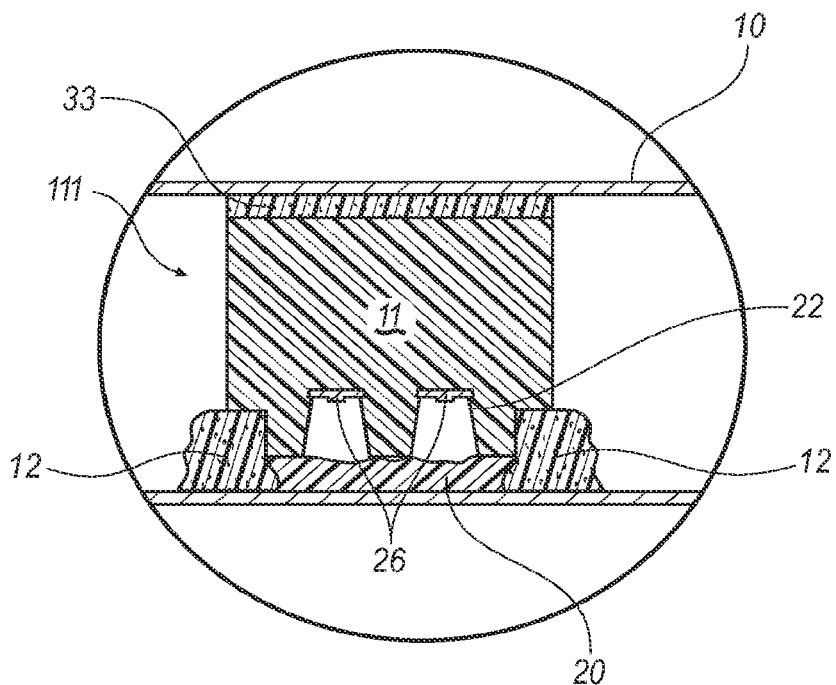
FIG. 2 is a side view of an insert in a horizontal cavity of a structural body after activation.

FIGS. 1 and 2 depict one embodiment of a horizontally-oriented cavity 10 that can be reinforced using a structural reinforcement material 20 on an insert 111. Insert 111 can be initially placed or fixed in the cavity 10 using a structural adhesive 33, or any other chemical adhesive or mechanical fastener. Alternatively, insert 111 may have leg supports (not shown) to retain insert 111 in the cavity 10. FIG. 1 represents cavity 10 before heating to or at an activation temperature occurs. In FIG. 1, insert 111 comprises a carrier 11 together with structural reinforcement material 20 and structural foam 12. The carrier 11 holds structural reinforcement material 20 in a holding area 22 using any available method, including mechanical fasteners such as clips 26.

FIG. 2 represents an embodiment of a horizontally-oriented cavity after heating to an activation temperature. In FIG. 2, insert 111 comprises a carrier 11 together with structural reinforcement material 20 and structural foam 12. During heating, structural reinforcement material 20 changes from a solid or formable dough phase to a liquid or substantially liquid phase. The structural reinforcement material 20 then flows from holding area 22 onto a surface in cavity 10 due to gravitational force. In this embodiment, structural foam 12 on the bottom extremities of carrier 11 expanded during heating and adhered to cavity 10. The expanded structural foam 12 of carrier 11 acts as a physical barrier, restricting the flow of structural reinforcement material 20 while structural reinforcement material 20 is in, substantially, a liquid phase. Following cure and/or cooling, structural reinforcement material 20 is a solid or a solid thermoset phase and provides structural reinforcement to cavity 10.

Figure 3:
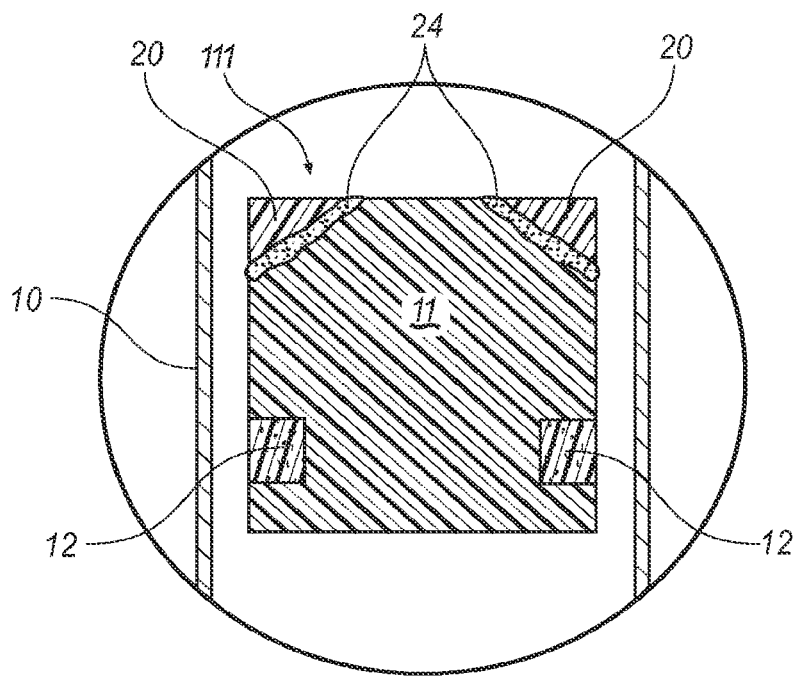
FIG. 3 is a side view of an insert in a vertical cavity of a structural body before activation.
Figure 4:
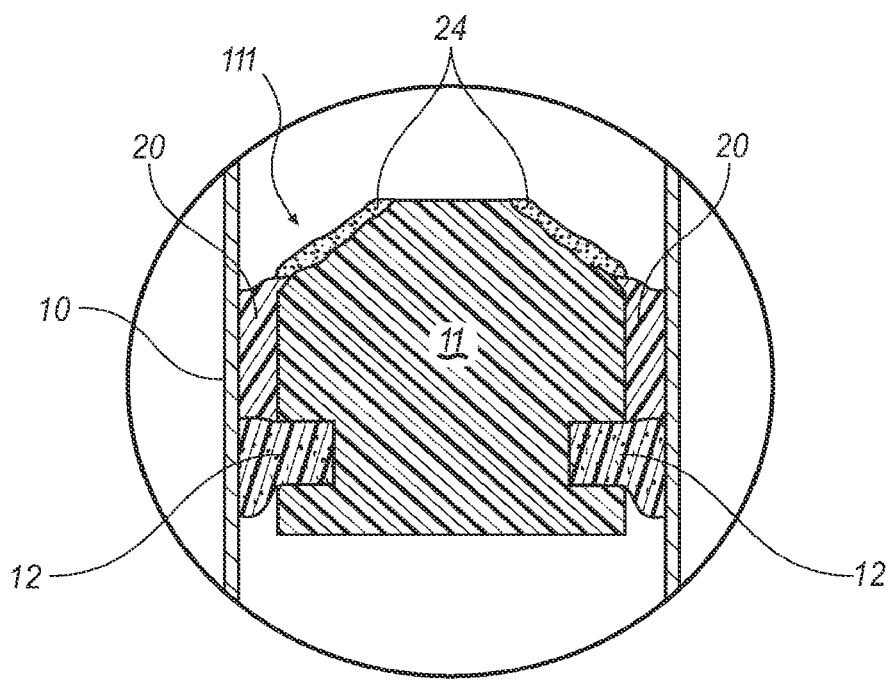
FIG. 4 is a side view of an insert in a vertical cavity of a structural body after activation.

FIGS. 3 and 4 depict one embodiment of a vertically-oriented cavity 10 that can be reinforced using a structural reinforcement material 20 on an insert 111. Insert 111 can be placed or secured in the cavity 10 by any method, including an adhesive (not shown) or a mechanical fastener (not shown), or a bend in the substantially vertical cavity 10 to provide a ledge (not shown). FIG. 3 represents cavity 10 before heating to an activation temperature occurs. In FIG. 3, insert 111 comprises a carrier 11 together with structural reinforcement material 20 and structural foam 12. The carrier 11 holds structural reinforcement material 20 in place before activation using any method, including adhesive 24.

FIG. 4 represents an embodiment of a vertically-oriented cavity after heating to an activation temperature. In FIG. 4, insert 111 comprises a carrier 11 together with structural reinforcement material 20 and structural foam 12. During heating, structural reinforcement material 20 changes from a solid or formable dough phase to a liquid or substantially liquid phase. The structural reinforcement material 20 then flows from carrier 11 onto a surface of cavity 10 and onto structural foam 12 due to gravitational force. In this embodiment, structural foam 12 expanded from carrier 11 and adhered to cavity 10. The structural foam 12 on carrier 11 acts as a physical barrier, restricting the flow of structural reinforcement material 20 while structural reinforcement material 20 is in, substantially, a liquid phase. Following cure and/or cooling, structural reinforcement material 20 is a solid or a thermoset phase and provides structural reinforcement to cavity 10.

In FIG. 5, automobile 2 is shown identifying many (but not all) cavities 10 that can be reinforced with structural reinforcement material 20. Some such cavities 10 may be vertical or substantially vertical, others may be horizontal or substantially horizontal. Some such cavities 10 are formed form metal, such as steel, but cavities 10 may be formed from any material including plastics. By way of non-limiting example, potentially reinforceable structures, having cavities 10 therein, on automobile 2 include but are not limited to A-pillar 4, rocker 6, child restraint reinforcer 100, frame rails 32, fuel tank sealer 36, cowl 38, bumper 40, B-pillar 42, and door/liftgate 44.

FIGS. 1-5 are merely exemplary and not intended to limit the appended claims to automotive applications, to particular configurations of inserts, to particular shapes or orientations of cavities, etc.

Structural Reinforcement Materials

Structural reinforcement material 20 comprises a base material selected from the group consisting of thermosets, thermoplastics with short transition phases and low viscosity, metallic alloys with low melting points, and combinations thereof. At about STP, the structural reinforcement material 20 is solid or is a formable dough or a mixture thereof. This way, manufacturing techniques including injection molding, extrusion, cutting or die stamping may be used to shape the structural reinforcement material 20 for inclusion on or in a carrier 11 to make an insert 111, or for direct insertion into a cavity 10.

When insert 111 is heated to an activation temperature, the structural reinforcement material 20 transforms to a flowable phase, such a liquid phase or a substantially liquid phase. This way, the structural reinforcement material 20 flows from a carrier 11 onto a surface of cavity 10 and adopts the form of the cavity 10, however irregular it may be. Gravity controls the flow of structural reinforcement material 20, along with any physical barriers. When cured and/or cooled, the structural reinforcement material 20 becomes either a solid or a solid thermoset that adheres to cavity 10 and is of sufficient strength to reinforce cavity 10.

Activation temperatures can be as low as about 100° C. (if the structural reinforcement material 20 comprises a metal alloy), about 120° C., about 140° C. or about 150° C., and as high as about 170° C., about 180° C. or about 190° C. Ranges from any one of these temperatures to any other of these temperatures are contemplated. In the case of an automobile, an activation temperature may be reached during the "bake" process.

Following cool-off and curing or hardening into a solid phase or a solid thermoset, the structural reinforcement material 20 has strength sufficient to reinforce the cavity 10. In one embodiment, the tensile strength and Young modulus of reinforcement material 20 is equal to or greater than that of expansible structural reinforcement foam 12 following activation.

In one embodiment, the tensile strength of the structural reinforcement material 20 is greater than about 20 MPa, and can range up to about 40 MPa, about 50 MPa or about 70 MPa. In one embodiment, the Young modulus of the structural reinforcement material 20 is greater than about 500 MPa, and can range up to about 1000 MPa or about 1500 MPa or about 3000 MPa.

Unlike expansible structural reinforcement foam 12, the strength properties of structural reinforcement material 20 is substantially independent of the heating conditions of, for example, a "bake" process. The strength properties of expansible structural reinforcement foam 12 depend substantially on the expansion rate, which in turn depends substantially on heating conditions including time and temperature. By contrast, in some embodiments of the claims appended below, structural reinforcement material 20 does not include an expanding agent, also known as a blowing agent, and its strength properties are unrelated to an expansion rate. Other embodiments of structural reinforcement material 20, however, may optionally include a blowing agent.

Compared to uncured expansible structural reinforcement foam 12, the thickness of structural reinforcement material 20 is reduced. The thickness of structural reinforcement material 20 plus a gap between an insert 111 and a structural cavity 10 can total about 3 to 5 mm to allow for flowing and assembly tolerances. This reduced thickness can improve global system performance.

In embodiments wherein one or more thermosets comprise the base material, crystalline cyclic oligoester-based thermoset polymers may be used, including polymers based upon cyclic oligo(butylterephthalates). Such oligoesters are commercially available through Cyclics Corp. Thermoset polymers formed from such oligoesters are described in WO 2006/075009 A1, herein incorporated by reference in its entirety. Such oligoesters may optionally be modified by, among other classes of compounds, organophilic clays and nanoclays, epoxy resins, and combinations thereof. Without being limited by theory, it is believed that such modification may provide the material 20 greater strength and increased moldability following polymerization and prior to being activated. The oligoesters are polymerized by a ring-opening melt polymerization process to create a polyester having a high molecular weight.

In another embodiment, a thermoset may comprise a one-component epoxy resin formulation that is a solid or a formable dough at about STP. A suitable formulation includes a mixture comprising from about 1% by weight to about 50% by weight of liquid epoxy resin, from about 10% by weight to about 50% by weight of solid epoxy resin, from about 5% by weight to about 30% by weight of tougheners, from about 2% by weight to about 10% by weight of latent hardener, and from about 5% by weight to about 40% by weight of fillers and additives.

Suitable liquid epoxy resins include bisphenol-A epoxy resins such as the DER liquid epoxy resins that are commercially available through the Dow Chemical Co. in Midland Mich. and the EPON liquid epoxy resins that are commercially available through Resolution Performance Products in Houston, Tex. Suitable solid epoxy resins may be of "type 1" to "type 6" (having molecular weights ranging from about 1000 to 6000 Daltons). Suitable solid epoxy resins are solid at room temperature and have a glass transition temperature greater than 30° C. Suitable solid epoxy resins should be substantially liquid when heated to at least about 120° C. or 140° C. or 150° C. and then have a viscosity of between 400 mPas and 15000 mPas. Suitable liquid epoxy resins include bisphenol-A epoxy resins such as the DER liquid epoxy resins that are commercially available through the Dow Chemical Co. in Midland, Mich. Epoxy resin formulations may include thixotropic agents, but the amount of thixotropic agents should be balanced by the presence of a liquid epoxy resin to ensure a good flow in the liquid or substantially liquid phase.

Suitable tougheners include reactive nitrile rubbers and polyurethane-based reactive liquid rubbers and the like. Suitable tougheners include the following commercially available liquid, monomeric, reactive rubbers: CTB, CTBN, CTBNX and ATBN, which are commercially available from B. F. Goodrich Chem. Co. in Cleveland Ohio. Core shell particles and polyacrylates may also be used as tougheners.

Suitable latent hardeners include dicyandiamide, 4,4'-diaminodiphenyl sulphone, boron trifluoride amine complexes, latent imidazoles, polycarboxylic acids, polyhydrazides, dicyandiamide, latent epoxy amine adducts and substituted ureas and the like. Suitable fillers include inorganic fillers such as silica, alumina, mica powder, calcium carbonate, aluminum hydroxide, magnesium carbonate, talc, clay, kaolin, dolomite, silicon carbide, glass powder, glass bubbles, titanium dioxide, boron nitride, or silicon nitride, and sheet and tape materials such as mica, glass, polyester, aramide, and/or polyimide and the like.

Suitable additives include pigments, coloring agents, flame retardants, diluents, coupling agents, flexibilizers, chemical blowing agents, physical blowing agents, trace amount of cure accelerators, dispersants, wetting agents, defoaming agents, antioxidants, ultraviolet absorbers, photostabilizers such as HALS, and reinforcing agents such as rubber particles, and the like. Any number of optional ingredients may be included in a one-component epoxy system, including triglycidylisocyanurate, terephthalic acid diglycidyl ether, trimellitic acid triglycidyl ether, hydroquinone diglycidyl ether solid adducts of trimethylolpropane-diglycidyl ether and diosocyanates, and mixtures thereof.

Commercially available one-component epoxy resin systems include SikaPower® 493 and SikaPower® 498 which can be used as sold or modified with higher filler loadings.

In another embodiment, a thermoset may comprise a one-component polyurethane elastomer (PUR) hot melt system. Suitable PUR hot melt systems include a crystalline, hydroxy-terminated polyester in combination with low molecular weight poloys or polyetherpolyols. The latent cross-linking, that does not occur until activation, involves blocked isocyanates commonly used in powder coating technology. A commercially available cross-linker is VESTAGON BF 1350 and BF 1540 from Degussa, a German company with offices in Parsippany, N.J. Polyisocyanates blocked with nucleophiles such as caprolactame, phenols or benzoxazolones are also suitable. Additionally, micro-encapsulated isocyanate particles with an inert shell comprising urethane or urea that releases the isocyanates at elevated temperatures, such as the activation temperatures. In this embodiment, the amine moiety from the inert shell reacts with the isocyanate and a polyol upon heating to form a PUR.

Any other thermoset may be used so long as the thermoset changes phases as described herein at an activation temperature and cures to have a strength sufficient to reinforce a cavity 10.

In embodiments where one or more thermoplastics comprise the base material, the thermoplastic material should have a short transition phase and low viscosity in its liquid phase. Polystyrene and polystyrene derivatives and the like are suitable, especially for applications calling for higher activation temperatures such as those over 200° C. or 210° C. For applications calling for a lower activation temperature and requiring less reinforcement strength, low density polyethylene and the like may be suitable. Suitable ranges of transition phases include from about 10 min at about 140° C. to about 30 minutes at about 195° C.; about 10 min at about 150° C. to about 30 minutes at about 175° C.; and about 15 min at about 150° C. to about 30 minutes at about 170° C. Suitable ranges of viscosity in the liquid phase include from about 500 mPas to about 100,000 mPas; 5,000 mPas to 50,000 mPas; and 7,000 mPas to 18,000 mPas.

Any other thermoplastic may be used so long as the thermpolastic changes phases as described herein at an activation temperature and cures to have a strength sufficient to reinforce a cavity 10.

In embodiments where one or more metallic alloys comprise the base material, the metallic base may comprise metal such as tin (Sn), indium (In), lead (Pb), or Bismuth (Bi), or a combination thereof. Most tin-based welding or solder alloys are suitable. In some embodiments, lead-free alloys may be used to avoid potential toxicity concerns. Other alloys may be also used. In embodiments including at least one metallic alloy, the alloy is eutectic or nearly eutectic and has a low melting point. Low melting points can be as low as about 100° C., about 120° C., about 140° C. or about 150° C., and as high as about 170° C., 180° C., or 190° C. Exemplary suitable alloys include Bismuth-Tin-Lead alloys like Rose's Metal, which includes about 50% Bi, 25% Pb, and 25% Sn (Bi50Pb25Sn25). Indalloys available from the Indium Corporation of America that have melting points from 103° C. to 227° C. are also suitable. Other exemplary alloys may include, at least, Orionmetall (Bi42Pb42Sn16), Bibrametall (Pb6020Bi15Sn), and Walker Alloy (Bi45Pb28Sn22Sb5).

Any other metal alloy may be used so long as the alloy changes phases as described herein at an activation temperature and solidifies to have a strength sufficient to reinforce a cavity 10.

Structural Reinforcement Foams

Structural foam 12 may optionally be used on or in a carrier 11. As shown in the embodiments depicted in FIGS. 1-4, expanded structural foam 12 can act as a physical barrier to prevent the flow of liquid-phase structural reinforcement material 20 into certain regions of cavity 10. In such an embodiment, uncured structural foam 12 expands during activation and adheres to cavity 10. Structural foam 12 may effectively seal off regions of cavity 10 to prevent the flow of structural reinforcement material 20 into those regions during a heating process such as a "bake" process.

Foam 12 may be any of the commercially available expansible foams. The Sika Corporation of Madison Heights, Mich., sells thermally expansible materials under the Sika-Baffle® trade name, which are described in U.S. Pat. Nos. 5,266,133 and 5,373,027, both of which are incorporated herein by reference in their entireties. The Sika Corporation also sells thermally expansible reinforcer materials under the trade name SikaReinforcer®. A series of these thermally expansible reinforcer materials, owned by the Sika Corporation, are described in the U.S. Pat. No. 6,387,470, incorporated herein by reference in its entirety. In embodiments employing a foam 12, one-component epoxy resin formulations are suitable that comprise a chemical or physical blowing agent and a curing agent.

In one embodiment, foam 12 activates and expands and cures at temperature slightly lower than the temperature at which structural reinforcement material 20 melts. Any expansible foam 12 may be used so long as the foam 12 expands in such a way as to adhere to cavity 10 and is capable of preventing the flow of liquid or substantially liquid structural reinforcement material 20 while the temperature of cavity 10 remains at or about an activation temperature.

Structural Adhesives

Structural adhesive 33 may optionally be used to secure an insert 111 into a cavity 10, where cavity 10 comprises metal such as steel or coated steel. Cavity 10 may also comprise plastics or other materials. The Sika Corporation of Madison Heights, Mich., sells a line of suitable structural adhesives under the tradenames SikaSeal® and Sikaflex®, which are suitable for use with various embodiments of the appended claims. Suitable adhesives may be epoxy-based, but any adhesive 33 may be used so long as it is capable of securing an insert 111 into a cavity 10 at least until the cavity 10 is heated to an activation temperature. Following activation, in the embodiment depicted in FIG. 2, the insert 111 is additionally held in place by foam 12 and structural reinforcement material 20.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application.

The invention claimed is:

1. A method of reinforcing a cavity, comprising:
   (a) inserting an insert into a cavity, the insert including a structural reinforcement material attached to a holding area of a carrier,
      (i) the carrier including
         a first end with an uncured expansible foam at or near the first end of the carrier,
         a second end opposite the first end with an uncured expansible foam at or near the second end of the carrier, and
         the holding area to which the structural reinforcement material is attached between the first end and the second end of the carrier, and
      (ii) the structural reinforcement material comprising
         a base material comprising one or more members selected from the group consisting of thermosets, low viscosity thermoplastics with short transition phases, and low melting point metallic alloys, wherein
            at about standard temperature and pressure (STP), the structural reinforcement material is in a phase selected from the group consisting of solid, formable dough, and mixtures thereof, and
            the structural reinforcement material transitions to a liquid or substantially liquid phase during heating at an activation temperature;
   (b) heating the insert to the activation temperature such that
      the uncured expansible foam at or near the first end of the carrier forms a first physical barrier of expanded structural foam at or near the first end of the carrier,
      the uncured expansible foam at or near the second end of the carrier forms a second physical barrier of expanded structural foam at or near the second end of the carrier,
      the structural reinforcement material transitions into a liquid or substantially liquid phase and flows into the cavity, and
      the first and second physical barriers restrict the flow of the liquid or substantially liquid phase structural reinforcement material from entering areas beyond the first and second physical barriers; and
   (c) cooling the insert such that the structural reinforcement material solidifies in the cavity and adheres to at least a portion of the cavity thereby reinforcing the cavity.

2. The method of claim 1, wherein the base material comprises a crystalline cyclic oligoester-based thermoset.

3. The method of claim 1, wherein the base material comprises a one-component epoxy thermoset.

4. The method of claim 1, wherein the base material comprises a one-component polyurethane elastomer hot melt thermoset.

5. The method of claim 1, wherein the base material comprises a thermoplastic having a transition phase of from about 10 minutes at about 140° C. to about 30 minutes at about 195° C.

6. The method of claim 1, wherein the base material comprises a thermoplastic having a transition phase of from about 10 minutes at about 150° C. to about 30 minutes at about 175° C.

7. The method of claim 1, wherein the base material comprises a thermoplastic having a transition phase of from about 15 minutes at about 150° C. to about 30 minutes at about 170° C.

8. The method of claim 1, wherein the base material comprises a thermoplastic having a viscosity of from about 500 mPas to about 100,000 mPas.

9. The method of claim 1, wherein the base material comprises a eutectic metallic alloy.

10. The method of claim 1, wherein the base material comprises a metallic alloy having a melting point of from about 100° C. to about 190° C.

11. The method of claim 1, wherein the base material comprises an alloy based on one or more metals selected from the group consisting of Sn, In, Bi, and Pb.

12. The method of claim 1, wherein the activation temperature ranges from at least about 120° to about 190° C.

13. The method of claim 1, wherein the structural reinforcement material that adheres to at least a portion of the cavity has a tensile strength of at least about 20 MPa.

14. The method of claim 1, wherein the structural reinforcement material that adheres to at least a portion of the cavity has a Young modulus of at least about 500 MPa.

15. The method of claim 1, wherein the carrier comprises metal or plastic or a combination thereof.

16. The method of claim 1 wherein the structural reinforcement material is attached to the holding area of the carrier with a mechanical fastener.

17. The method of claim 1 wherein the structural reinforcement material is attached to the holding area of the carrier with an adhesive.

18. The method of claim 1 wherein the cavity is defined by metal.

19. The method of claim 1 wherein the cavity is within an automobile.

20. The method of claim 1, wherein the cavity is within a frame rail of an automobile.

21. The method of claim 1, wherein the cavity is within an A pillar or within a B pillar of an automobile.

22. A method of reinforcing a cavity, comprising:
(a) inserting an insert into a cavity, the insert including a structural reinforcement material attached to a holding area of a carrier via a mechanical fastener and an adhesive,
   (i) the carrier including
      a first end with an uncured expansible foam at or near the first end of the carrier,
      a second end opposite the first end with an uncured expansible foam at or near the second end of the carrier, and
      the holding area to which the structural reinforcement material is attached between the first end and the second end of the carrier, and
   (ii) the structural reinforcement material comprising
      a base material comprising one or more members selected from the group consisting of thermosets, low viscosity thermoplastics with short transition phases, and low melting point metallic alloys, wherein
         at about standard temperature and pressure (STP), the structural reinforcement material is in a phase selected from the group consisting of solid, formable dough, and mixtures thereof, and
         the structural reinforcement material transitions to a liquid or substantially liquid phase during heating at an activation temperature;
(b) heating the insert to the activation temperature such that
   the uncured expansible foam at or near the first end of the carrier forms a first physical barrier of expanded structural foam at or near the first end of the carrier,
   the uncured expansible foam at or near the second end of the carrier forms a second physical barrier of expanded structural foam at or near the second end of the carrier
   the structural reinforcement material transitions into a liquid or substantially liquid phase and flows into the cavity, and
   the first and second physical barriers restrict the flow of the liquid or substantially liquid phase structural reinforcement material from entering areas beyond the first and second physical barriers; and
(d) cooling the insert such that the structural reinforcement material solidifies in the cavity and adheres to at least a portion of the cavity thereby reinforcing the cavity.

* * * * *